(PRIOR ART)

United States Patent Office 3,822,158
Patented July 2, 1974

3,822,158
METHOD OF REFURBISHING REFLECTIVE-TYPE PAVEMENT MARKERS
Kenneth C. Hoffman, 22 W. 665 Poplar, Glen Ellyn, Ill. 60608, and Kenneth M. Johnson, 6015 W. Melrose, Chicago, Ill. 60634
Filed Aug. 14, 1972, Ser. No. 280,668
Int. Cl. B32b 35/00
U.S. Cl. 156—98                                                                      11 Claims

ABSTRACT OF THE DISCLOSURE

A method of refurbishing a deteriorated light-receiving face of reflective-type pavement marker comprising removing the outer surface of a deteriorated light-receiving face, as by mechanical abrasion, applying an adhesive coating to the abraded light-receiving surface, positioning a transparent pane, as of high-impact high-abrasion glass, acrylic or other similar material and subjecting the resultant structure to curing conditions sufficient to form a unitary refurbished light-receiving face.

BACKGROUND OF THE INVENTION

Field of the Invention

The invention relates to methods of refurbishing reflective-type structures and more particularly to a method of refurbishing reflective-type pavement markers.

Prior Art

Reflective-type devices having a transparent light-receiving face and a reflecting system spaced inwardly therefrom for reflecting light impinging on the face are known. For example, Stimson U.S. Pat. 1,906,655 or Heenan U.S. Pat. 3,332,327 illustrate exemplary forms of such devices.

When such reflective-type devices are utilized as pavement markers, for example, as centerline markers for highways, they are subjected to extremely hazardous or detrimental environment. Trucks, cars and other vehicular devices traveling at highway speeds strike the light-receiving faces of such pavement markers with their wheels, throw stones and other abrasive material thereagainst and otherwise deteriorate the light-reflecting ability of such markers. At present, deteriorated pavement markers must be completely replaced at a relatively high cost.

The invention provides a method of economically refurbishing deteriorated light-receiving faces of such markers so that costly replacement of the units can be avoided and the useful life of the markers be prolonged.

SUMMARY OF THE INVENTION

The invention generally comprises removing an outer surface of a deteriorated light-receiving face from a reflective-type pavement marker, applying a water-clear adhesive, such as an epoxy, polyester, modified acrylic, etc. adhesive material to the remaining portion of such face, applying a transparent pane or lens to the adhesive-coated face such as composed of a high-impact, high-abrasion-resistant material, and subjecting the resultant structure to curing conditions, such as ambient conditions, sufficient to achive a unitary refurbished light-receiving face having light transmission characteristics similar to the original undeteriorated structure.

In preferred embodiments, only about 0.04 to .01 inch of the deteriorated outer face surface is removed, as by a sanding device, and any deeper imperfections in the surface are allowed to remain for filling with the adhesive material. Preferred materials for the transparent lens include high-impact, high-abrasion-resistant glass, acrylic resins, modified polycarbonate resins, modified polyvinyl chloride resins and other similar materials.

DESCRIPTION OF THE PREFERRED EMBODIMENTS

The invention generally comprises an economic method of refurbishing deteriorated light-receiving faces of reflective-types devices, such as pavement markers and other light-reflective structures.

Light-reflective structures, an exemplary embodiment of which are pavement markers, are formed so as to have a transparent light-receiving face and a reflecting system spaced inwardly therefrom for reflecting light impinging on the face back to an observer. Obviously, at least the light-receiving face portions of such structure must be formed of transparent material so that light may be properly transmitted therethrough. However, ambient environmental conditions soon deteriorate the outer surface of such faces and materially detract from their light-transmitting characteristics.

Figure 1:
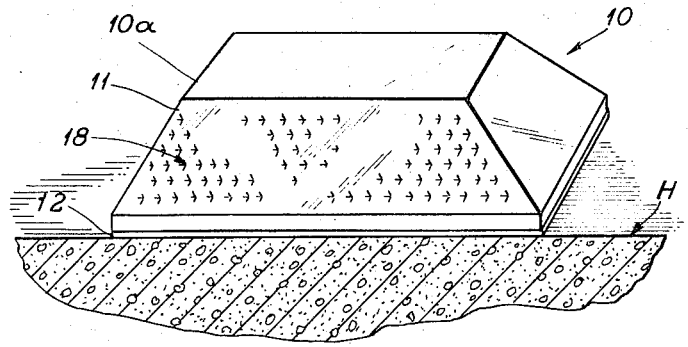
FIG. 1 is a perspective elevational view of a prior art reflective-type pavement marker.

FIG. 1 illustrates an exemplary embodiment of a reflective-type pavement marker 10 of the type shown in U.S. Pat. 3,332,327 (which is incorporated herein by reference). Generally, pavement marker 10 includes a monolithic outer shell 10a composed of a light transmitting resin, such as methyl methacrylate, more commonly referred to as acrylic resin. The interior of shell 10a is filled with a suitable core material, such as an epoxy resin which combines with the shell 10a and forms a unitary monolithic structure. The shell 10a has at least one light-receiving face 11 orientated in respect to a light source for reflecting light from such source toward an expected observer. Thus, with a pavement marker, the light-receiving face is orientated so as to form an acute angle of about 15° to 45° with the pavement surface. A vertically orientated face would also reflect light but would constitute a vehicular hazard. For this and other reasons, pavement markers do not utilize such orientation for their light-receiving faces, although other reflective-type structures may have their light-receiving faces orientated in such a manner.

Figure 2:
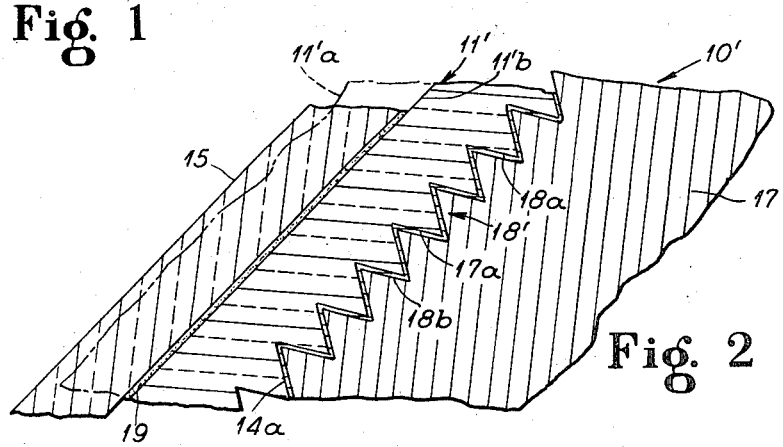
FIG. 2. is a fragmentary cross-sectional view, with portions in phantom, illustrating a refurbished face of a reflective-type pavement marker formed in accordance with the principles of the invention.

A reflective system 18 is positioned inwardly from the outer surface of face 11 and may comprise a reflex-reflecting system of the type shown in U.S. Pat. 1,906,655. Of course, other reflective systems may also be utilized. As shown at FIG. 2, a reflex-reflective system 18' is comprised of a plurality of reflection elements 18a, each having three square planar surfaces arranged at mutually right angles and meeting at a common point remote from the outer surface of the light-receiving face so as to form a cube corner. Such reflective elements have a total internal reflection of light impinged thereon and are sometimes referred to as triple mirror reflector structures or Stimson's cube corners. For improved reflection, the inner surface 14a of a light-receiving face may be coated with a light-reflective material 18b, such as by metallizing surface 14a. Generally, the reflective elements are formed during molding of the outer shell with an appropriately designed mold and then filled with a core material, such as an epoxy resin so as to form a monolithic structure. The reflective system forms an integral part of a reflective-type device, such as pavement marker 10. Pavement markers, such as 10, are permanently secured to a highway surface H with an adhesive layer 12. Generally, normal highway traffic and contact by vehicular wheels cannot dislodge a marker 10 from its position. However, the adhesive bond between the marker and the pavement surface can be broken by a special device if desired, during costly replacement procedures.

When a pavement marker, such as 10', has been in service for a period of time in a highway environment, it becomes less efficient in reflecting on-coming light at its deteriorated light-receiving face 11'. The outer surface 11'a of face 11' becomes pitted, gouged, scuffed, coated with a more or less permanent opaque film, etc. which materially interferes with light transmission through such face. Generally, an outer shell and thus the light-receiving face of a pavement marker is formed with an overall wall thickness in the order of about .05 to 0.06 inch and only the outer surface thereof is deteriorated during use. Of course, some indentations or gouges on the face are deeper than others.

In accordance with the principles of the invention, only a relatively thin outer section of a deteriorated face (such as shown in phantom at FIG. 2) is replaced to refurbish such face to nearly its original light transmission characteristics. Removal of the outer surface 11'a of a deteriorated light-receiving face 11' is economically accomplished by mechanical means, such as with a sanding device. With this type of removal operation, the remaining face portion 11'b is smooth and planar-like and can be readily restored to is original or substantially original light transmission operation. While it is possible to remove the entire light-receiving face 11', it is preferable to remove only a sufficient amount to smooth out most surface irregularities and remove any surface film that may be present on a deteriorated light-receiving face. Further, it is preferable to leave a sufficient amount of the light-receiving face on the pavement marker to protect the original reflective system, such as 18' between the inner surface 14a of the face 11' and the outer surface 17a of the core material 17.

In preferred embodiments, an outer section of only about .01 to 0.04 inch in thickness is removed from a deteriorated light-receiving face. Deteriorated areas or holes extending inwardly deeper than the removed outer section are filled with the adhesive when an adhesive coating 19 is applied on the remaining portion 11'b of the face 11'. The adhesive coating is applied by various conventional techniques, such as trowelling, brushing, rolling, etc.

The adhesive is selected so as to be compatible with with the material of shell 11' and with the material of the pane or lens 15. In addition, an adhesive must care in a transparent film so as not to interfere with the light-transmission operation of the light-receiving face. Such clear adhesives are generally referred to in the art and herein as water-clear adhesives and include epoxy, polyester, modified acrylics such as cyanoacrylate contact adhesive, etc. Preferably, the adhesive cures or sets under ambient conditions within a relatively short period of time. However, if desired, heat and pressure may be utilized during the cure cycle for more efficient operation. In either case, once a lens has been applied to the adhesive layer, the resultant structure is subjected to curing conditions sufficient to form a unitary refurbished light-receiving face.

The transparent pane or lens 15 is preferably composed of a high-impact, high-abrasion-resistant material compatible with the intended environment, i.e. a highway environment. Preferred materials include high-impact, high-abrasion-resistant glass and high-impact, high-abrasion-resistant acrylic resin. Exemplary embodiments of other suitable lens materials are modified polycarbonate resins, for example, as disclosed in U.S. Pat. 3,652,328, modified polyvinyl chloride resins, for example, as disclosed in U.S. Pats. 3,657,390 or 3,657,391 and other similar materials.

The select lens material is preferably formed as a planar sheet or the like of a size in accordance with the light-receiving face. The lens is preferably relatively thin, in the order of the removed outer section of the light-receiving face.

Figure 3:
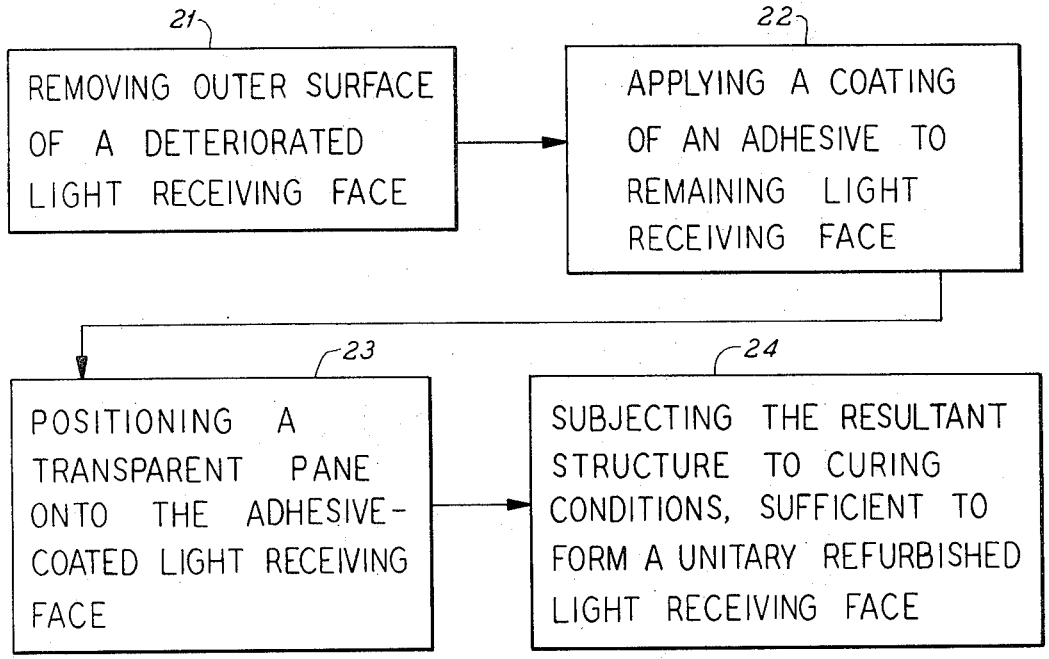
FIG. 3 is a flow diagram of an embodiment of the invention.

FIG. 3 is a flow diagram of a preferred embodiment of the invention and includes a plurality of sequential steps 21–24, which may be performed singularly or continuously as by a machine or manually. The first step 21 comprises removing the outer surface of a deteriorated light-receiving face of a reflective-type structure, such as the above described pavement marker, by a suitable means. In preferred embodiments the outer surface is removed by mechanical means, such as a sanding operation. The second step 22 comprises applying a relatively thin adhesive coating on the remaining portion of the light-receiving face. Of course, the adhesive coating has a sufficient depth at least in select areas to completely fill any deeper surface imperfections that may be present. The third step 23 comprises positioning a transparent pane onto the adhesive-coated face and step 24 comprises subjecting the resultant structure to curing conditions sufficient to form a unitary refurbished light-receiving face having light transmission characteristics similar to the original undeteriorated light-receiving face. Exemplary curing conditions comprise a time period of about one hour at ambient temperature.

As is apparent from the foregoing specification, the present invention is susceptible of being embodied with various alterations and modifications which may differ particularly from those that have been described in the preceding specification and description. For example, the transparent pane or lens may be formed L-shaped for securement not only along the light-receiving face but also along the top surface thereof. Further, only select areas, such as a plurality of circular areas, of a deteriorated light-receiving face may be refurbished. In such a modified system, the lens would be of a matching circular shape and be completely surrounded at their edges, after enplacement, by the original face material. For this reason, it is to be fully understood that all of the foregoing is intended to be merely illustrative and is not to be construed or interpreted as being restrictive or otherwise limiting of the present invention, excepting as is set forth and defined in the hereto appendant claims.

What is claimed is:

1. A method of refurbishing a deteriorated light-receiving face of a reflective-type pavement marker having at least one transparent light-receiving face and a reflecting system spaced inwardly therefrom for reflecting light impinging on said face, comprising;

removing at least an outer surface of a deteriorated light-receiving face;

applying a coating of a water-clear adhesive onto the remaining portion of said light-receiving face;

positioning a transparent pane onto said adhesive-coated light-receiving face; and subjecting the resulting structure to curing conditions sufficient to form a unitary refurbished light-receiving face.

2. A method as defined in claim 1 wherein the transparent pane is of planar configuration.

3. A method as defined in claim 1 wherein the transparent pane is composed of a high-impact, high-abrasion-resistant material.

4. A method as defined in claim 3 wherein the transparent pane is composed of a glass material.

5. A method as defined in claim 3 wherein the transparent pane is composed of an acrylic material.

6. A method as defined in claim 1 wherein the adhesive is an epoxy material.

7. A method as defined in claim 1 wherein the adhesive is a polyester material.

8. A method as defined in claim 1 wherein the outer surface of the deteriorated light-receiving face is removed by a mechanical means.

9. A method as defined in claim 1 wherein an outer surface in a thickness of about .01 to 0.04 inch is removed from the deteriorated light-receiving face.

10. A method as defined in claim 1 wherein any deep imperfections extending inwardly from the outer surface of the deteriorated light-receiving face toward the refective system are only partially removed and the remainder thereof are filled with the adhesive during the coating step.

11. A method of refurbishing a deteriorated light-receiving face of a reflective-type structure having at least one transparent light-receiving face and a reflective system spaced inwardly therefrom for reflecting light impinging on said face, comprising;

removing at least an outer surface of a deteriorated light-receiving face;
  applying a coating of a water-clear adhesive onto the remaining portions of said light-receiving face;
  positioning a transparent pane onto said adhesive-coated light-receiving face; and
  subjecting the resulting structure to curing conditions sufficient to form a unitary refurbished light-receiving face.

References Cited
UNITED STATES PATENTS

| | | | |
|---|---|---|---|
| 2,458,032 | 1/1949 | Simon et al. | 156—98 |
| 3,176,420 | 4/1965 | Alverson | 117—35 X |
| 3,334,555 | 8/1965 | Nagin et al. | 117—2 R |
| 2,259,610 | 10/1941 | Bryson | 404—16 |
| 3,485,148 | 12/1969 | Heenan | 404—16 X |

EDWARD G. WHITBY, Primary Examiner

U.S. Cl. X.R.

117—2 R, 35 R; 264—36; 404—16, 72